United States Patent
Sata

(10) Patent No.: US 6,187,276 B1
(45) Date of Patent: *Feb. 13, 2001

(54) METHOD AND APPARATUS FOR REMOVING INDOOR VOLATILE ORGANIC SUBSTANCE

(75) Inventor: Naoaki Sata, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/116,566

(22) Filed: Jul. 16, 1998

(30) Foreign Application Priority Data

Sep. 8, 1997 (JP) .................................................. 9-242777

(51) Int. Cl.⁷ ............................... B01J 8/00; B01J 23/00; B01J 23/38; B01J 23/40; A61L 9/00
(52) U.S. Cl. ........................ 423/210; 423/210; 423/245.1; 423/245.3; 422/120; 422/122; 502/100; 502/300; 502/325; 502/329
(58) Field of Search ............................... 423/245.1, 245.3, 423/213.2, 210; 422/120, 122, 307; 502/100, 300, 325, 327, 332, 333, 334, 339

(56) References Cited

U.S. PATENT DOCUMENTS

| 4,661,329 | * | 4/1987 | Suzuki et al. | 423/245 |
|---|---|---|---|---|
| 5,585,083 | * | 12/1996 | Kielin et al. | 423/245.3 |
| 5,676,912 | * | 10/1997 | Sharma et al. | 423/213.2 |

OTHER PUBLICATIONS (Abstract): Girman et al., "The Bake–out of an Office Building: A Case Study", Environmrntal International, 15 (1–6), pp. 449–453, 1989.*

Derwent–Acc–No.: 1998-171049, Mar. 25, 1998.*

* cited by examiner

Primary Examiner—Tom Dunn
Assistant Examiner—Eileen E. Nave
(74) Attorney, Agent, or Firm—Young & Thompson

(57) ABSTRACT

A method and apparatus for effectively conducting removal of an indoor volatile organic substance in a closed system without ventilation so that a volatile organic substance given off by bakeout is oxidized and removed in the presence a catalyst, especially a noble-metal-base oxidation catalyst in a closed system without ventilation of the indoor while using a heat source for the bakeout as a heat source for heating the catalyst.

8 Claims, No Drawings

METHOD AND APPARATUS FOR REMOVING INDOOR VOLATILE ORGANIC SUBSTANCE

BACKGROUND OF THE INVENTION a) Field of the Invention

This invention relates to a method and apparatus for removing an indoor volatile organic substance, and more specifically to a method and apparatus for removing an indoor volatile organic substance, especially methanal (formaldehyde) or the like given off by bakeout (which will be described subsequently herein) or the like, which features treatment of the volatile organic substance in a closed system without ventilation by using a catalyst capable of oxidizing the volatile organic substance into carbon dioxide and water.

b) Description of the Related Art

From the viewpoint of energy saving or the like, a measure has been taken in recent years to make improvements in the air tightness of houses, offices and the like. As a result, this has, however, led to deterioration in the quality of indoor air due to less frequent air changes. This deterioration has now come to be known as so-called sick building syndrome, chemical substance anaphylaxis and the like, and is increasingly becoming an issue.

In particular, volatile organic substances (methanal, namely, formaldehyde and the like) contained in finishing materials, primers and structural materials for floors, walls and the like gradually evaporate into rooms after execution of works, and become a primary cause for deterioration in the quality of the indoor air of houses and the like having high air tightness.

As a measure for thoroughly overcoming such a problem, the use of construction materials which are free of volatile organic substances such as methanal (or which contain them at substantially reduced levels) may be contemplated. These construction materials are however costly and, under the current circumstances, a substantial amount of time will be needed until they are used widely.

Concerning houses already built with construction materials containing methanal or the like, there is a need to entirely replace such construction materials with non-methanal (or low-methanal) construction materials. Due to cost problems or the like, this is however practically almost unfeasible in many instances.

As a next best measure, it has hence been proposed to drive out and eliminate volatile organic substances by bakeout. The term "bakeout" means a method which comprises heating the interior of a room to 40° C. or so under mechanical ventilation to forcibly release volatile organic substances, which still remain in finishing materials and the like, into the atmosphere. According to this method, conventional construction materials containing methanal or the like can be used as they are and, further, this method is also applicable to already built houses and the like.

The present applicant has already attempted to remove a volatile organic substance (specifically, methanal) by this method [see, for example, the Preprints of the 14th Air Cleaning and Contamination Control Research Conference, page 173 (1996); and the 15th Air Cleaning and Contamination Control Research Conference, page 187 (1997)]. Through these attempts, it has been ascertained that there is a correlation among the indoor temperature during bakeout, the surface temperature of a given construction material and the amount of a volatile organic substance given off from the construction material and that the amount of the volatile organic substance given off from the construction material abruptly increases with the surface temperature. Described specifically, a rise in the surface temperature as small as 3 to 5° C. is sufficient to result in the release of a volatile organic substance at a rate about twice as would otherwise occur.

As is indicated in the above publications, an application of bakeout makes it possible to lower the concentration of methanal to significant extent in indoor air. For this method, however, mechanical ventilation is indispensable for the removal of evaporated methanal or the like. As a result, outdoor air flows in so that the indoor temperature drops. This temperature drop is unnegligibly substantial especially when the above method is conducted in winter or in a cold area.

Since the amount of methanal to be given off decreases abruptly with a drop in temperature as described above, sufficient removal effects may not be available where the temperature drops as a result of mechanical ventilation.

It is however actually difficult to set a higher temperature in expectation of such a temperature drop, because with construction materials forming a building or house, such as timber, there is a potential problem of strain and deformation developing due to uneven drying or the like.

SUMMARY OF THE INVENTION

An object of the present invention is therefore to provide a method and apparatus, which is free of the above-described problems and can be adapted to conduct removal of an indoor volatile organic substance in a closed system without ventilation by using a catalyst.

The above object of the present invention can be achieved by the present invention which will be described hereinafter.

The present invention therefore provides a method for removing a volatile organic substance given off by bakeout, which comprises using a catalyst capable of removing said volatile organic substance and heating said catalyst by a heat source for said bakeout. The present invention also provides an apparatus for removing a volatile organic substance given off by bakeout, which comprises a catalyst capable of removing said volatile organic substance, wherein said catalyst is heated by a heat source for said bakeout.

This invention makes it possible to effectively remove and treat an indoor volatile organic substance in a closed system without ventilation, thereby bringing about the advantage that the indoor air can be treated in the closed system extremely effectively and easily compared with conventional methods.

DETAILED DESCRIPTION OF THE INVENTION AND PREFERRED EMBODIMENTS

Owing to the removal of the volatile organic substance by the use of the catalyst, this invention has made it possible to perform the removal of the volatile organic substance without ventilation (in a closed system). Described specifically, use of a catalyst with palladium and platinum carried on aluminum oxide or a like catalyst permits oxidation of a volatile organic substance such as methanal into carbon dioxide and water and hence removal of the volatile organic substance while maintaining, as a closed system, a system from which the volatile organic substance is to be removed.

According to the method of the present invention, the volatile organic substance is converted into relatively harmless carbon dioxide and water. At concentrations (about 0.5 ppm or so even at the maximum) and treatment time (about 72 hours or so even at the maximum) of the volatile organic substance to be treated generally, the concentration of carbon dioxide so formed does not reach any level which could become a problem from the standpoint of safety. This carbon dioxide may however be taken out of the system, for example, by using a drain pipe or the like as needed if a need arises for the removal of the carbon oxide because of the use of the method under special conditions.

Further, if formation of dew becomes a problem, for example, in winter, the treatment can be conducted while using a dehumidifier or the like in combination. In this case, occurrence of mold or the like can be avoided.

Different from the conventional technology, the present invention permits conducting the treatment in a closed system, thereby permitting easy temperature control. With thorough stirring by a fan or the like, the volatile organic substance can be effectively treated.

As methods for the removal of a volatile organic substance in a closed system, there is an adsorptive removal method making use of activated carbon or the like in addition to the method of the present invention. This adsorptive removal method however involves problems such as low adsorption velocity, limited treatment capacity (because of a limitation to the adsorption of activated carbon per unit weight), and occurrence of waste in a large volume.

Embodiments of the present invention will hereinafter be described specifically.

Any catalyst can be used in the present invention insofar as it can conduct oxidation treatment of a volatile organic substance such as methanal. An optimal one varies depending on the kind of the target volatile organic substance to be treated.

Although a noble-metal-base catalyst with palladium and platinum carried on aluminum oxide is especially effective, a catalyst carrying palladium and platinum desirably in ranges of from 0.05 to 5 wt. %, respectively, more desirably in ranges of from 0.15 to 1.5 wt. %, respectively, is effective for the removal of a wide range of volatile organic substances such as aldehydes and hydrocarbons.

If the amounts of carried palladium and platinum are less than 0.05 wt. %, respectively, this catalyst may not bring about sufficient removing effect and may not be practical in some instances. If their carried amounts exceed 5 wt. %, on the other hand, problems may arise such as separation of the carried noble metals from the metal carrier during use, leading to higher cost or the like and deteriorated economy in some instances.

Details of the present invention will hereinafter be described by examples.

EXAMPLE 1

In a house newly built by employing construction materials making use of methanal-containing bonds (1F Japanese-style room: 8 mats wide, 1F Western-style room: 12 mats wide, 1F kitchen: 8 mats wide, 2F Japanese-style room: 10 mats wide, 2F Western-style room: 6 mats wide; total amount of the methanol-containing bonds used: about 80 kg), the temperature of each room was set at 40° C., a removal apparatus for volatile organic substances, said apparatus being equipped with a catalyst useful in the present invention, that is, a catalyst with palladium and platinum carried in proportions of 1 wt. %, respectively, on aluminum oxide, and a fan (for keeping the temperature even) were arranged in each room, and each room was then treated at a catalyst temperature of 300° C. for 48 hours. The results are shown below in Table 1.

TABLE 1

| Concentration of methanal | Before bakeout (ppm) | After bakeout (ppm) |
| --- | --- | --- |
| 1F J-style room | 0.101 | 0.043 |
| 1F W-style room | 0.202 | 0.049 |
| 1F kitchen | 0.134 | 0.036 |
| 2F J-style room | 0.097 | 0.039 |
| 2F W-style room | 0.188 | 0.033 |

It is understood from Table 1 that the concentration of methanal substantially dropped in each room after the treatment. Incidentally, the concentrations of methanal were measured by the AHMT (4-amino-3-hydrazino-5-mercapto-1,2,4-triazole) method while using a diffusion-type sampler manufactured by Shibata Kagaku K.K.

COMPARATIVE EXAMPLE 1

A similar experiment was conducted by a conventional method. The results are shown below in Table 2.

TABLE 2

| Concentration of methanal | Before bakeout (ppm) | After bakeout (ppm) |
| --- | --- | --- |
| 1F J-style room | 0.106 | 0.067 |
| 1F W-style room | 0.186 | 0.083 |
| 1F kitchen | 0.149 | 0.074 |
| 2F J-style room | 0.114 | 0.059 |
| 2F W-style room | 0.165 | 0.063 |

It is appreciated from Table 2 that the concentration of methanal dropped more or less in each room after the treatment in Comparative Example 1. It is however understood that, as is evident from a comparison with Table 1, the concentration of methanal in each room after the completion of the bakeout in Comparative Example 1 is considerably higher than the corresponding concentration in Example 1 and the method of Comparative Example 1 is thus inferior to that of Example 1.

EXAMPLE 2

In a house built 3 years ago (1F Japanese-style room: 6 mats wide, 1F Western-style room: 8.5 mats wide, 1F Western-style room+kitchen: 16.5 mats wide, 2F Japanese-style room: 6 mats wide, 2F Western-style room: 7.6 mats wide; estimated total amount of methanol-containing bonds used: about 100 kg), the temperature of each room was set at 40° C., a removal apparatus for volatile organic substances, said apparatus being equipped with a catalyst useful in the present invention, that is, a catalyst with palladium and platinum carried in proportions of 1 wt. %, respectively, on aluminum oxide, and a fan (for keeping the temperature even) were arranged in each room, and each room was then treated at a catalyst temperature of 300° C. for 48 hours. The concentrations of methanal, toluene and ethyl ethanoate before and after the treatment and also upon an elapsed time of 1 year after the treatment were measured, respectively.

The results are shown below in Table 3 to Table 5.

TABLE 3

| Concentration of methanal | Before bakeout (ppm) | After bakeout (ppm) | Upon elapsed time of 1 year after treatment (ppm) |
| --- | --- | --- | --- |
| 1F J-style room | 0.088 | 0.044 | 0.043 |
| 1F W-style room | 0.165 | 0.034 | 0.039 |
| 1F W-style + kitchen | 0.232 | 0.041 | 0.059 |
| 2F J-style room | 0.059 | 0.030 | 0.033 |
| 2F W-style room | 0.113 | 0.051 | 0.059 |

TABLE 4

| Concentration of toluene | Before bakeout (ppm) | After bakeout (ppm) | Upon elapsed time of 1 year after treatment (ppm) |
| --- | --- | --- | --- |
| 1F J-style room | 2.43 | 0.70 | 0.81 |
| 1F W-style room | 7.30 | 0.90 | 1.99 |
| 1F W-style + kitchen | 3.46 | 0.66 | 1.24 |
| 2F J-style room | 1.42 | 0.64 | 0.89 |
| 2F W-style room | 4.13 | 1.08 | 1.69 |

TABLE 5

| Concentration of ethyl ethanoate | Before bakeout (ppm) | After bakeout (ppm) | Upon elapsed time of 1 year after treatment (ppm) |
| --- | --- | --- | --- |
| 1F J-style room | 0.38 | 0.11 | 0.10 |
| 1F W-style room | 0.34 | 0.14 | 9.19 |
| 1F W-style + kitchen | 0.26 | 0.12 | 0.16 |
| 2F J-style room | 0.20 | 0.06 | 0.09 |
| 2F W-style room | 0.93 | 0.13 | 0.16 |

The concentrations of methanal were measured in a similar manner as in Example 1. On the other hand, the concentrations of toluene and ethyl ethanoate were each conducted by desorbing the corresponding target gas, which had been adsorbed on an tube of activated carbon over 48 hours, with carbon disulfide and determining its quantity by a gas chromatograph equipped with FID (flame ionization detector).

As is apparent form Example 2, the removing treatment technology according to the present invention exhibits sufficient effects even for houses built several years ago.

Since the concentration of methanal in each room was still kept at the low concentration upon the elapsed time of 1 year after the treatment, it is understood that substantial portions of volatile organic substances such as methanal in construction materials were caused to evaporate and were then subjected to decomposition treatment by the bakeout in accordance with the removing treatment technology of the present invention.

What is claimed is:

1. A method for removing a volatile organic substance given off by bakeout within an unventilated, enclosed space, which comprises the steps of: using a catalyst capable of removing said volatile organic substance and heating said catalyst by a heat source for said bakeout within an unventilated, enclosed space being maintained at an elevated temperature, the elevated temperature being less than a temperature of said catalyst.

2. The method of claim 1, wherein said catalyst is a noble-metal-base oxidation catalyst.

3. The method of claim 1, wherein said catalyst is an oxidation catalyst with palladium and platinum carried on aluminum oxide.

4. The method of claim 1, wherein said catalyst is an oxidation catalyst with palladium and platinum carried in ranges of from 0.05 to 5 wt. %, respectively, on aluminum oxide.

5. An apparatus for removing a volatile organic substance given off by bakeout of an unventilated, enclosed space, which comprises a catalyst capable of removing said volatile organic substance, and a heat source to maintain said catalyst at a first predetermined temperature and to heat the enclosed space to a second predetermined temperature.

6. The apparatus of claim 5, wherein said catalyst is a noble-metal-base oxidation catalyst.

7. The apparatus of claim 5, wherein said catalyst is an oxidation catalyst with palladium and platinum carried on aluminum oxide.

8. The apparatus of claim 5, wherein said catalyst is an oxidation catalyst with palladium and platinum carried in ranges of from 0.05 to 5 wt. %, respectively, on aluminum oxide.

* * * * *